United States Patent
Ishikawa et al.

(10) Patent No.: US 12,067,441 B2
(45) Date of Patent: Aug. 20, 2024

(54) DETERMINING THE POSITION OF A RADIO TAG USING A LEARNED MODEL

(71) Applicant: TOSHIBA TEC KABUSHIKI KAISHA, Tokyo (JP)

(72) Inventors: Hiroyuki Ishikawa, Sunto Shizuoka (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 17/852,441

(22) Filed: Jun. 29, 2022

(65) Prior Publication Data
US 2023/0062536 A1    Mar. 2, 2023

(30) Foreign Application Priority Data
Sep. 1, 2021   (JP) .................. 2021-142625

(51) Int. Cl.
*G06K 7/10* (2006.01)
*G01S 1/38* (2006.01)
(52) U.S. Cl.
CPC ............ *G06K 7/10128* (2013.01); *G01S 1/38* (2013.01)

(58) Field of Classification Search
CPC ....................................................... G06K 7/10
See application file for complete search history.

(56) References Cited

U.S. PATENT DOCUMENTS

2018/0074159 A1 *   3/2018   Mullessary ............. G01S 13/84
2019/0392183 A1    12/2019   Oishi

* cited by examiner

*Primary Examiner* — Daniell L Negron
(74) *Attorney, Agent, or Firm* — Amin, Turocy & Watson, LLP (57) ABSTRACT

A communication device includes an antenna, a driving unit, a first acquisition unit, an input unit, and a second acquisition unit. The driving unit moves a position of the antenna. The first acquisition unit acquires tag data of each radio tag based on a radio wave of each radio tag received by the antenna at a plurality of positions of the antenna. The input unit inputs the tag data of each radio tag at the plurality of positions of the antenna into a learned model. The second acquisition unit acquires, from the learned model, data indicating whether each radio tag is included in a first range or a second range based on the input of the tag data of each radio tag into the learned model by the input unit.

20 Claims, 11 Drawing Sheets

| | POSITION (mm) | 0 | a | 2a | ... | L-2a | L-a | L |
|---|---|---|---|---|---|---|---|---|
| RADIO TAG A | PHASE (°) | | | | | | | |
| | RADIO WAVE RECEPTION STRENGTH | | | | | | | |
| RADIO TAG B | PHASE (°) | | | | | | | |
| | RADIO WAVE RECEPTION STRENGTH | | | | | | | |
| ... | | | | | | | | |

DETERMINING THE POSITION OF A RADIO TAG USING A LEARNED MODEL

CROSS-REFERENCE TO RELATED APPLICATION

This application is based upon and claims the benefit of priority from Japanese Patent Application No. 2021-142625, filed on Sep. 1, 2021, the entire contents of which are incorporated herein by reference.

FIELD

Embodiments described herein relate generally to a communication device and an information processing method.

BACKGROUND

There is a device that determines whether a radio tag is within a predetermined range or out of the predetermined range by receiving a radio wave transmitted from the radio tag attached to an article with an antenna. The above-described device moves the antenna to measure a phase of the radio tag. The device determines whether the radio tag is within the predetermined range or out of the predetermined range based on a phase difference which is a change amount of the measured phase. The device is required to set a phase difference corresponding to a boundary of the predetermined range as a threshold value.

If a predetermined fixed threshold value is used for a determination process, determination accuracy may deteriorate due to an influence of an environment such as disturbance.

DETAILED DESCRIPTION

An aspect to be solved by embodiments is to provide a technique for improving accuracy of determining a position of a radio tag.

In general, according to one embodiment, a communication device includes an antenna, a driving unit, a first acquisition unit, an input unit, and a second acquisition unit. The driving unit moves a position of the antenna. The first acquisition unit acquires tag data of each radio tag based on a radio wave of each radio tag received by the antenna at a plurality of positions of the antenna. The input unit inputs, into a learned model, the tag data of each radio tag acquired by the first acquisition unit at the plurality of positions of the antenna. The second acquisition unit acquires, from the learned model, data indicating whether each radio tag is included in a first range or a second range based on the input of the tag data of each radio tag into the learned model by the input unit. The learned model is a model generated by machine learning based on learning data including the tag data of a plurality of radio tags at the plurality of positions of the antenna, and the data indicating whether each of the plurality of radio tags is included in the first range or the second range.

Hereinafter, a communication system according to an embodiment will be described with reference to the drawings. In each drawing used for describing the following embodiments, a scale of each unit may be appropriately changed. In each drawing used for describing the following embodiments, a configuration may be omitted for the sake of description.

Figure 1:
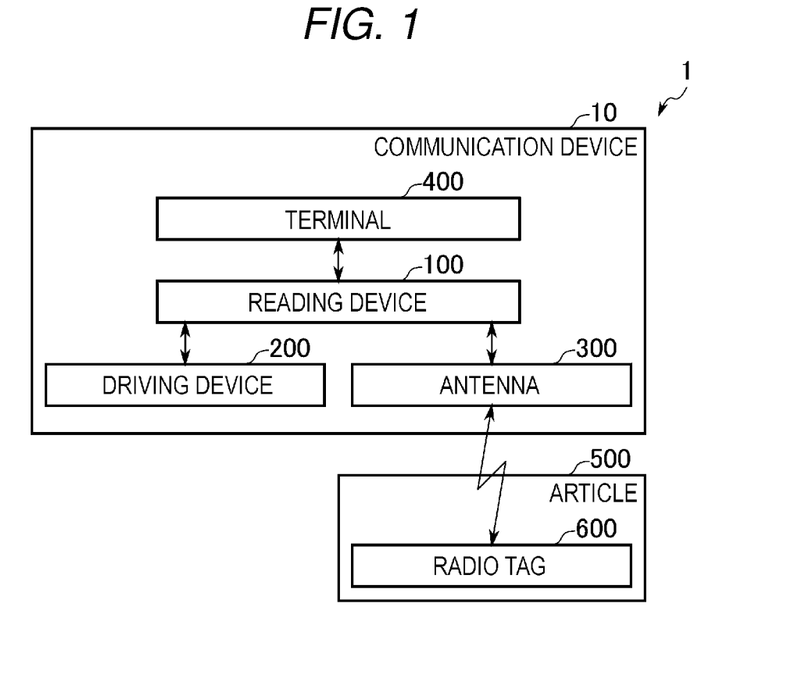
FIG. 1 is a block diagram showing an example of a configuration of a communication system according to an embodiment.

FIG. 1 is a block diagram showing an example of a configuration of a communication system 1 according to the embodiment.

The communication system 1 includes a communication device 10 and a plurality of radio tags 600 attached to a plurality of articles 500. While FIG. 1 shows one radio tag 600 attached to one article 500, the communication system 1 includes a plurality of radio tags 600 attached to a plurality of articles 500.

The communication device 10 is a device that reads information from the radio tag 600 and processes the read information. The communication device 10 can be used for inspection and the like in a warehouse, and an application example of the communication device 10 is not limited thereto. The communication device 10 includes a reading device 100, a driving device 200, an antenna 300, and a terminal 400.

The reading device 100 is a device that controls the driving device 200 and the antenna 300 to read the information from the radio tag 600. A configuration example of the reading device 100 will be described later.

The driving device 200 is a device that moves the antenna 300. A configuration example of the driving device 200 will be described later.

The antenna 300 transmits and receives a radio wave to and from the radio tag 600. The antenna 300 converts the radio wave received from the radio tag 600 into a high frequency signal, and outputs the converted high frequency signal to the reading device 100.

The terminal 400 is a device that processes the information read from the radio tag 600 by the reading device 100. The terminal 400 is a personal computer (PC) or the like and is not limited thereto as long as the terminal 400 is any device that processes information.

The article 500 is merchandise and the like.

The radio tag 600 is typically a radio frequency identification (RFID) tag. The radio tag 600 may be another radio tag. The radio tag 600 is a passive type radio tag that operates by using a predetermined radio wave transmitted from the antenna 300 as an energy source. The radio tag 600 transmits a signal including information stored in the radio tag 600 by performing backscatter modulation on an unmodulated signal. The information stored in the radio tag 600 may include identification information that can be uniquely identified. The information stored in the radio tag 600 may include information on the article 500 to which the radio tag 600 is attached.

The reading device 100 will be described with reference to FIG. 2.

Figure 2:
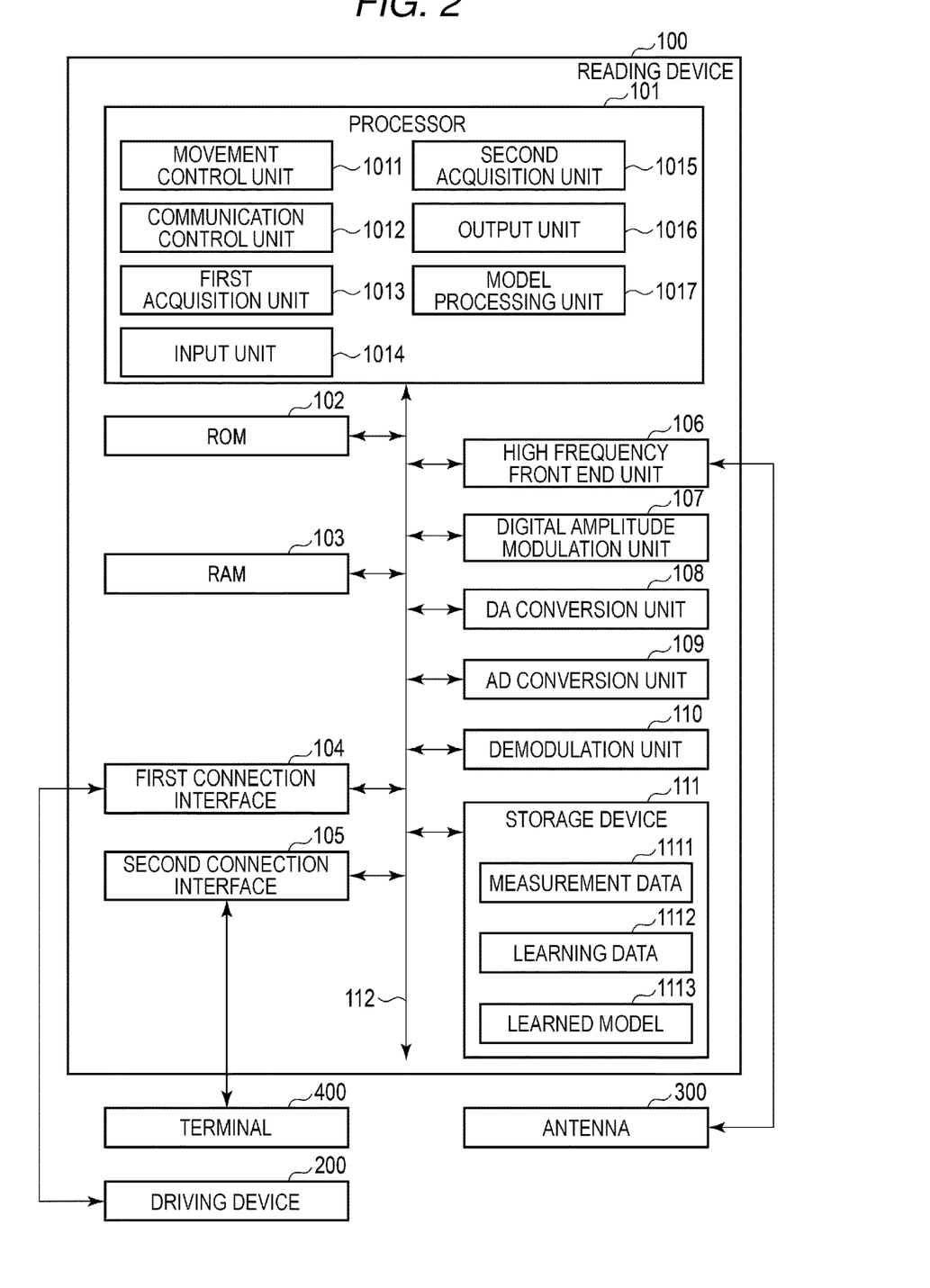
FIG. 2 is a block diagram showing an example of a configuration of a reading device.

FIG. 2 is a block diagram showing an example of a configuration of the reading device 100.

The reading device 100 includes a processor 101, a read-only memory (ROM) 102, a random-access memory (RAM) 103, a first connection interface 104, a second connection interface 105, a high frequency front end unit 106, a digital amplitude modulation unit 107, a digital to analog (DA) conversion unit 108, an analog to digital (AD) conversion unit 109, a demodulation unit 110, and a storage device 111. The respective units provided in the reading device 100 are connected to each other by a bus 112 and the like.

The processor 101 corresponds to a central portion of a computer that performs processes such as an arithmetic operation and control necessary for an operation of the reading device 100. The processor 101 loads various programs stored in the ROM 102 or the storage device 111 in the RAM 103. By executing the program loaded in the RAM 103, the processor 101 implements respective units to be described later and executes various operations.

The processor 101 includes a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), and the like. The processor 101 may be a combination of a plurality of these units and devices.

The ROM 102 corresponds to a main memory device of the computer in which the processor 101 serves as a central portion of the computer. The ROM 102 is a non-volatile memory exclusively used for reading data. The ROM 102 stores the program. The ROM 102 stores data or various setting values used by the processor 101 for performing various processes.

The RAM 103 corresponds to a main memory device of the computer in which the processor 101 serves as a central portion of the computer. The RAM 103 is a memory used for reading and writing data. The RAM 103 is a work area that stores data temporarily used by the processor 101 for performing various processes.

The first connection interface 104 is an interface for allowing the reading device 100 to communicate with the driving device 200.

The second connection interface 105 is an interface for allowing the reading device 100 to communicate with the terminal 400.

The high frequency front end unit 106 outputs a high frequency signal to the antenna 300. The high frequency signal is input into the high frequency front end unit 106 from the antenna 300.

The digital amplitude modulation unit 107 is a circuit that adds information to be transmitted to the radio tag 600 to a carrier wave to be transmitted to the radio tag 600.

The DA conversion unit 108 is a circuit that converts a digital signal into an analog signal. The DA conversion unit 108 converts the digital signal modulated by the digital amplitude modulation unit 107 into the analog signal. The DA conversion unit 108 outputs the high frequency signal to the antenna 300 via the high frequency front end unit 106.

The AD conversion unit 109 is a circuit that converts an analog signal into a digital signal. The AD conversion unit 109 converts the high frequency signal input from the antenna 300 via the high frequency front end unit 106 into the digital signal.

The demodulation unit 110 is a circuit that extracts various pieces of information from the radio wave received from the radio tag 600. For example, the demodulation unit 110 extracts a unique identification code stored in the radio tag 600 from the digital signal converted by the AD conversion unit 109. When receiving the radio wave of the radio tag 600 by the antenna 300 by using a well-known technique, the demodulation unit 110 outputs tag data of the radio tag 600 in time series from the digital signal converted by the AD conversion unit 109. The tag data is time-series data based on the radio wave of the radio tag 600 received by the antenna 300. The tag data includes phase data. The phase data is data indicating a phase of the radio wave from the radio tag 600. The tag data includes radio wave reception strength (RSSI (received signal strength indicator)) data. The radio wave reception strength data is data indicating reception strength of the radio wave from the radio tag 600. The tag data may include both the phase data and the radio wave reception strength data. When receiving the radio wave transmitted from the antenna 300, each radio tag 600 can store the radio wave reception strength data in a memory of each radio tag 600. In this example, the demodulation unit 110 may extract the radio wave reception strength data being stored in the radio tag 600 in time series from the digital signal converted by the AD conversion unit 109. The demodulation unit 110 is an example of a detection unit that detects the tag data of each radio tag 600 in time series based on the radio wave from each radio tag 600.

The storage device 111 is a device formed of a non-volatile memory for storing data, programs, and the like.

The storage device 111 is formed of a hard disk drive (HDD), a solid state drive (SSD), and the like, and is not limited thereto. The storage device 111 is an example of a storage unit.

The storage device 111 stores measurement data 1111.

The measurement data 1111 includes the tag data of each radio tag 600 to be determined at a plurality of positions of the antenna 300. The tag data of each radio tag 600 to be determined is correlated with each of the plurality of positions of the antenna 300. The tag data in the measurement data 1111 is the data measured by the reading device 100. The radio tag 600 to be determined is a radio tag to be determined for confirming whether a position of the radio tag 600 is included in a first range or a second range. The tag data of the radio tag 600 to be determined is also referred to as tag data for determination. The first range and the second range are different ranges that do not overlap each other. For example, the first range and the second range are three-dimensional areas. Examples of the first range and the second range will be described later. The measurement data 1111 can be updated. A configuration example of the measurement data 1111 will be described later.

The storage device 111 stores learning data 1112.

The learning data 1112 is data used for machine learning. The learning data 1112 includes the tag data of a plurality of radio tags 600 to be learned at a plurality of positions of the antenna 300. The tag data of each radio tag 600 to be learned is correlated with each of the plurality of positions of the antenna 300. The tag data of the radio tag 600 to be learned is data measured in advance by the reading device 100. The tag data of the radio tag 600 to be learned is also referred to as tag data for learning. The learning data 1112 includes correct answer data indicating whether each of the plurality of radio tags 600 to be learned is included in the first range or the second range. It can also be said that the correct answer data indicates whether the position of each of the plurality of radio tags 600 to be learned is included in the first range or the second range. The correct answer data is data input by a user. The learning data 1112 can be updated.

The storage device 111 stores a learned model 1113.

The learned model 1113 is a model generated by the machine learning based on the learning data 1112. The description of "generation" includes not only a newly generated mode but also an updated mode. The learned model 1113 is used to determine whether the position of the radio tag 600 to be determined is included in the first range or the second range. The learned model 1113 outputs output data for determination based on an input of input data for determination. The input data for determination is the tag data for determination of each radio tag 600 to be determined at a plurality of positions of the antenna 300. The tag data of each radio tag 600 to be determined is correlated with each of the plurality of positions of the antenna 300. The output data for determination is data indicating whether each radio tag 600 to be determined is included in the first range or the second range. Each radio tag 600 to be determined is correlated with the first range or the second range.

A bus 112 includes a control bus, an address bus, a data bus, and the like. The bus 112 transfers a signal transmitted and received to and from each unit of the reading device 100.

A hardware configuration of the reading device 100 is not limited to the above-described configuration. The reading device 100 can omit and change the above-described component, and add a new component as appropriate.

Each unit implemented by the processor 101 will be described.

The processor 101 implements a movement control unit 1011, a communication control unit 1012, a first acquisition unit 1013, an input unit 1014, a second acquisition unit 1015, an output unit 1016, and a model processing unit 1017. Each unit implemented by the processor 101 can also be referred to as each function. Each unit implemented by the processor 101 can also be implemented by a control unit including the processor 101, the ROM 102, and the RAM 103.

The movement control unit 1011 controls the movement of the antenna 300 by controlling the driving device 200.

The communication control unit 1012 controls the start and end of transmission of the radio wave from the antenna 300.

The first acquisition unit 1013 acquires the tag data for determination of each radio tag 600 to be determined, based on the radio wave of each radio tag 600 received by the antenna 300 at a plurality of positions of the antenna 300.

The input unit 1014 inputs the input data for determination into the learned model 1113. The input data for determination is the tag data for determination of each radio tag 600 to be determined, acquired by the first acquisition unit 1013, at the plurality of positions of the antenna 300.

The second acquisition unit 1015 acquires the output data for determination from the learned model 1113, based on the input of the input data for determination into the learned model 1113 by the input unit 1014.

The output unit 1016 outputs a determination result to the terminal 400. The determination result includes the data which is acquired as the output data for determination by the second acquisition unit 1015 and indicates whether each radio tag 600 to be determined is included in the first range or the second range.

The model processing unit 1017 generates the learned model 1113.

Figure 3:
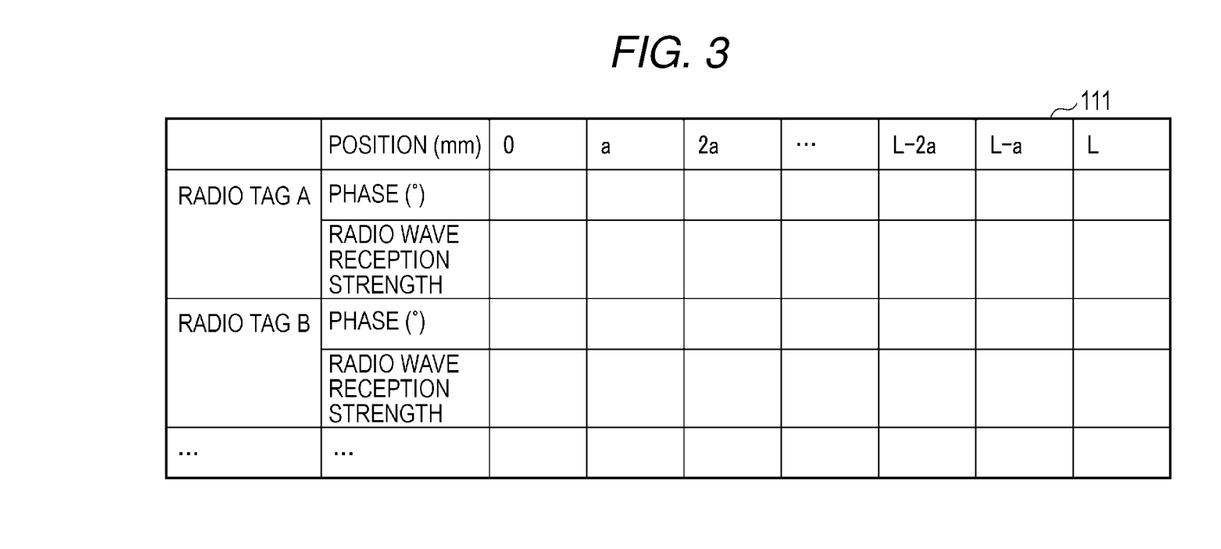
FIG. 3 is a diagram showing an example of a data structure forming measurement data.

FIG. 3 is a diagram showing an example of a data structure forming the measurement data 1111.

The antenna 300 is assumed to reciprocate in one direction based on the control by the driving device 200. It is assumed that a scanning range of the antenna 300 is a range in one direction from a position 0 corresponding to a home position to a position L. The position L can be appropriately set.

The measurement data 1111 includes the tag data of each radio tag 600 to be determined correlated with each of the plurality of positions of the antenna 300. For example, the plurality of positions of the antenna 300 are positions at a fixed space a from the position 0 to the position L. A value of the fixed space a can be appropriately set. The measurement data 1111 may include the tag data of each radio tag 600 to be determined correlated with each of the positions at the fixed space a at least from the position 0 to the position L. The measurement data 1111 may include the tag data of each radio tag 600 to be determined correlated with each of positions different from each of the positions at the fixed space a from the position 0 to the position L.

The driving device 200 will be described with reference to FIGS. 4 and 5.

Figure 4:
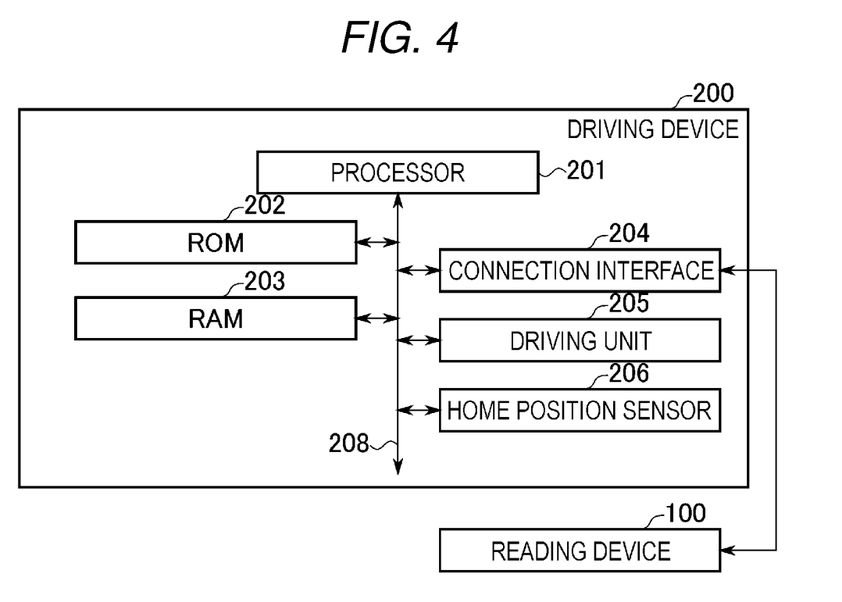
FIG. 4 is a block diagram showing an example of a configuration of a driving device.

FIG. 4 is a block diagram showing an example of a configuration of the driving device 200.

The driving device 200 includes a processor 201, a ROM 202, a RAM 203, a connection interface 204, a driving unit 205, and a home position sensor 206. The respective units provided in the driving device 200 are connected to each other by a bus 208 and the like.

The processor 201 corresponds to a central portion of a computer that performs processes such as an arithmetic operation and control necessary for an operation of the driving device 200. The processor 201 loads various programs stored in the ROM 202 and the like in the RAM 203. The processor 201 executes various operations by executing the program loaded in the RAM 203. The processor 201 is a CPU, a MPU, a SoC, a DSP, a GPU, an ASIC, a PLD, a FPGA, or the like. The processor 201 may be a combination of a plurality of these units and devices.

The ROM 202 corresponds to a main memory device of the computer in which the processor 201 serves as a central portion of the computer. The ROM 202 is a non-volatile memory exclusively used for reading data. The ROM 202 stores the program. The ROM 202 stores data or various setting values used by the processor 201 for performing various processes.

The ROM 203 corresponds to a main memory device of the computer in which the processor 201 serves as a central portion of the computer. The RAM 203 is a memory used for reading and writing data. The RAM 203 is a work area that stores data temporarily used by the processor 201 for performing various processes.

The connection interface 204 is an interface for allowing the driving device 200 to be connected to the reading device 100.

The driving unit 205 moves the antenna 300. For example, the driving unit 205 is a stepping motor.

The home position sensor 206 is a sensor that detects whether or not a moving stage 213 to be described later is in the home position.

The bus 208 includes a control bus, an address bus, a data bus, and the like. The bus 208 transfers a signal transmitted and received to and from each unit of the driving device 200.

Figure 5:
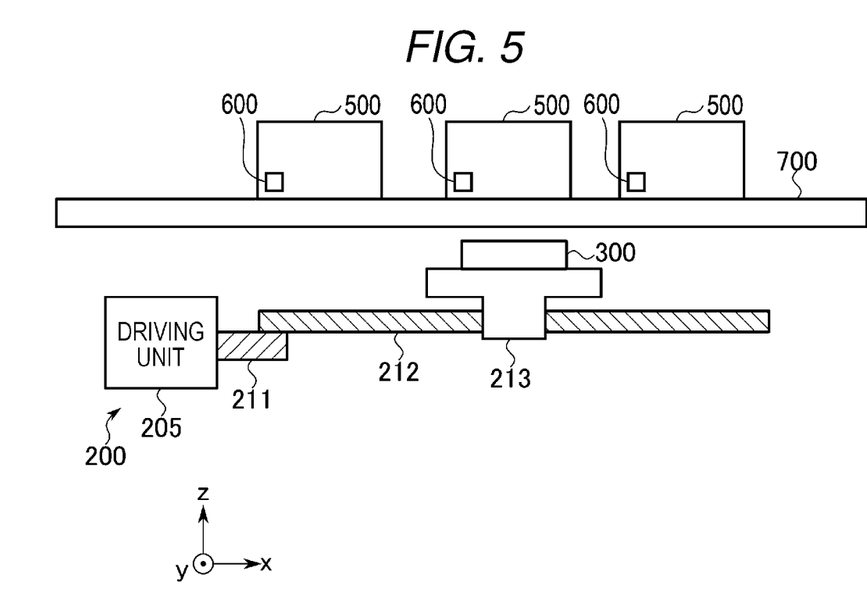
FIG. 5 is a schematic diagram showing the driving device.

FIG. 5 is a schematic diagram showing the driving device 200.

The driving device 200 includes a rotating shaft 211, a rail 212, and the moving stage 213.

As shown in FIG. 5, the driving device 200 and the antenna 300 are disposed below a counter table 700. However, the antenna can be disposed in any suitable relative position, so long as the antenna functions properly. For example, the antenna can be disposed above the counter table, or on any side of the counter table. The counter table 700 is a table having a horizontal plane on which the article 500 attached with the radio tag 600 is placed. The counter table 700 is an example of a placement unit. The counter table 700 may be provided in the communication system 1 or the communication device 10.

The rotating shaft 211 transmits a driving force of the driving unit 205. A screw groove is formed in the rotating shaft 211 and the rail 212. The screw grooves of the rotating shaft 211 and the rail 212 are connected to face each other. Therefore, if the driving unit 205 is rotationally driven, the rotating shaft 211 rotates and the rail 212 moves. The moving stage 213 on which the antenna 300 is placed is mounted on the rail 212.

The moving stage 213 includes a ball screw nut, and if the rail 212 is rotated by the ball screw nut, the moving stage 213 moves in a horizontal direction. That is, the moving stage 213 moves in a direction along an x-axis shown in FIG. 5. If a rotation direction of the rail 212 is reversed, the moving stage 213 moves in an opposite direction. In this manner, the driving device 200 causes the antenna 300 to reciprocate along the rail 212 in one direction of the x-axis.

A hardware configuration of the driving device 200 is not limited to the above-described configuration. The driving device 200 can omit and change the above-described component and add a new component as appropriate.

The first range and the second range will be described.

Figure 6:
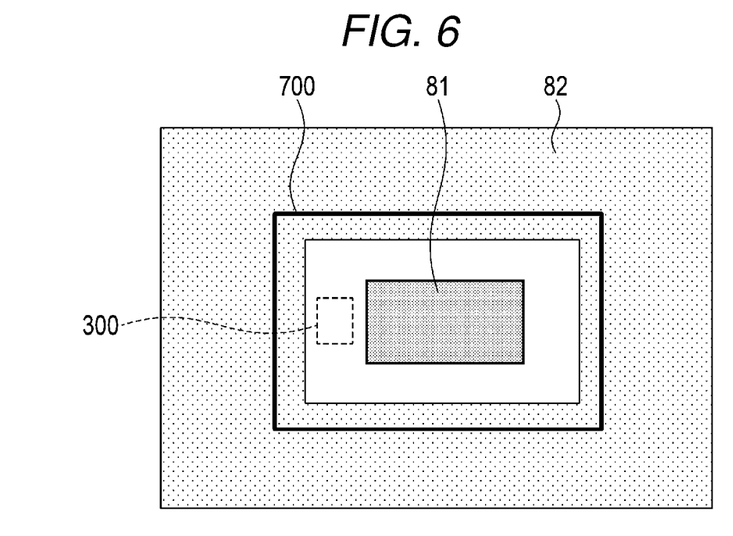
FIG. 6 is a schematic diagram showing a first range and a second range.

FIG. 6 is a schematic view showing a first range 81 and a second range 82, and is a plan view of the counter table 700 when viewed from above.

The first range 81 and the second range 82 are ranges separated in a horizontal direction. The first range 81 is a range set in a central portion of the horizontal plane of the counter table 700. The second range 82 is a range set outside an outer peripheral portion of the horizontal plane of the counter table 700 and the counter table 700 in the horizontal direction. The second range 82 is set to surround the first range 81. In FIG. 6, the second range 82 is set to be spaced apart from the first range 81 without being adjacent thereto, and is not limited thereto. The second range 82 may be adjacent to the first range 81.

The settings of the first range 81 and the second range 82 are not limited thereto. The first range 81 may be a range set in the central portion of the horizontal plane of the counter table 700, and the second range 82 may be a range set in the outer peripheral portion of the horizontal plane of the counter table 700. Alternatively, the first range 81 may be a range set on the entire horizontal plane of the counter table 700, and the second range 82 may be a range set outside the counter table 700 in the horizontal direction. The second range 82 is not limited to the range set to surround the first range 81.

The first range 81 and the second range 82 may be different ranges that do not overlap each other, and are not limited to the ranges separated from each other in the horizontal direction. The first range 81 and the second range 82 may be ranges separated from each other in a vertical direction.

Figure 7:
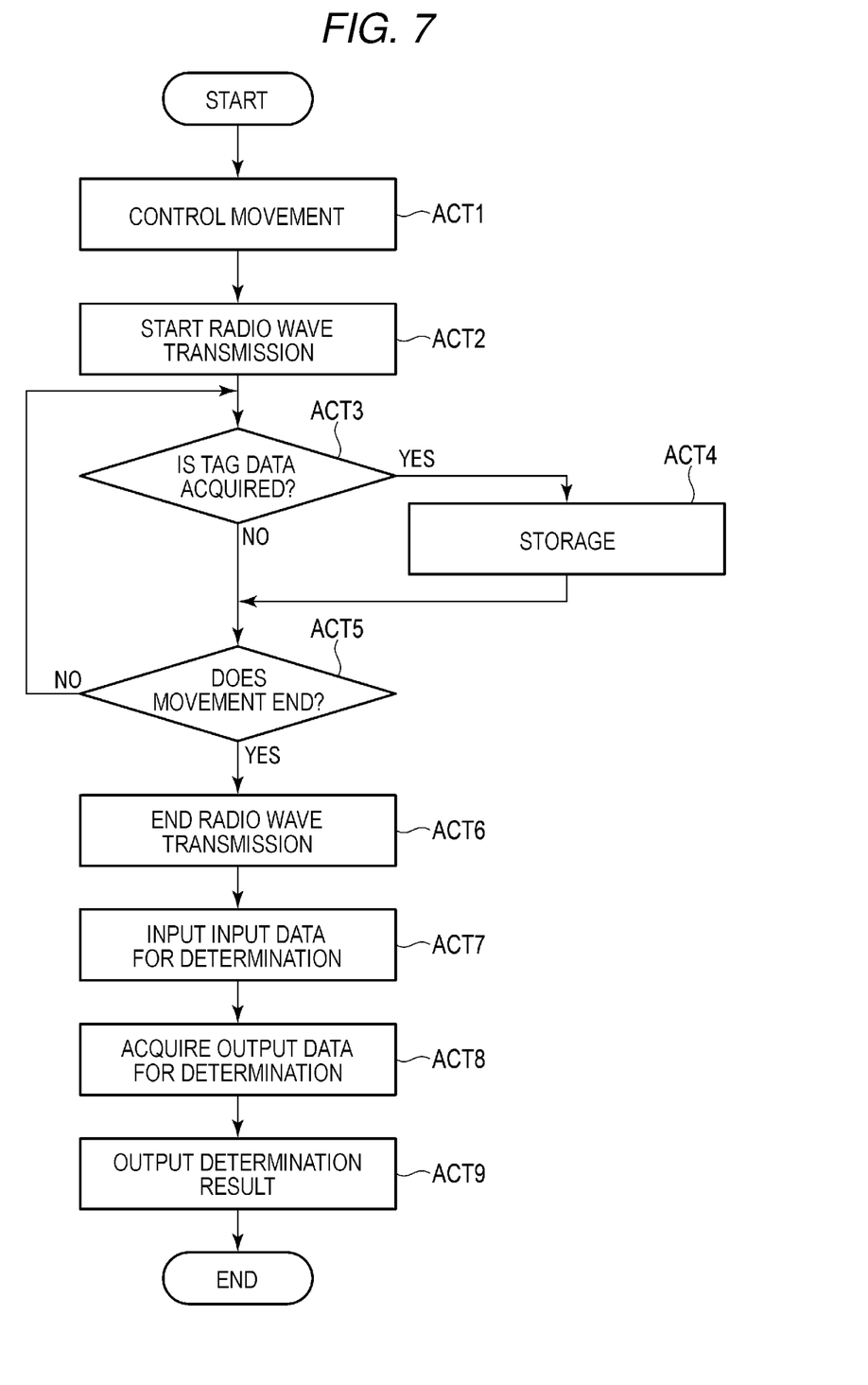
FIG. 7 is a flowchart showing an example of a determination process by a processor of the reading device.

Next, a determination process by the processor 101 of the reading device 100 configured as described above will be described. The determination process is a process of acquiring the data indicating whether each radio tag 600 to be determined is included in the first range or the second range.

FIG. 7 is a flowchart showing an example of the determination process by the processor 101 of the reading device 100.

A processing procedure to be described below is only an example, and each process may be changed as much as possible. In the processing procedure to be described below, steps can be appropriately omitted, replaced, and added according to the embodiment.

For example, it is assumed that the counter table 700 is a table on which the article 500, from which the information stored in the radio tag 600 is read, is placed. In the vicinity of the counter table 700, there may be an article from which the information stored in the radio tag 600 is not intended to be read.

The processor 101 of the reading device 100 may start the determination process, based on acquisition of a determination process start instruction input into the terminal 400 by a user.

The movement control unit 1011 controls movement of the antenna 300 (ACT 1). In ACT1, for example, the movement control unit 1011 transmits a movement instruction to the driving device 200. The movement instruction is an instruction to move the antenna 300 in one direction from the position 0 corresponding to the home position to the position L.

The processor 201 of the driving device 200 receives the movement instruction from the reading device 100. Based on the movement instruction therefrom, the processor 201 determines whether or not the antenna 300 is in the home position by using the home position sensor 206. If the antenna 300 is not in the home position, the processor 201 controls the driving unit 205 to move the antenna 300 to the home position. The driving unit 205 moves the antenna 300 to the home position based on the control by the processor 201. The processor 201 controls the driving unit 205 to start the movement of the antenna 300 from the position 0 corresponding to the home position. The driving unit 205 starts the movement of the antenna 300 from the position 0 based on the control by the processor 201. The processor 201 controls the driving unit 205 to move the antenna 300 in one direction from the position 0 to the position L. The driving unit 205 moves the antenna 300 in one direction from the position 0 to the position L based on the control by the processor 201.

The communication control unit 1012 controls a start of radio wave transmission from the antenna 300 (ACT 2). In ACT 2, for example, the communication control unit 1012 controls the start of the radio wave transmission from the antenna 300 based on the start of the movement of the antenna 300 from the position 0. The communication control unit 1012 may control the start of the radio wave transmission from the antenna 300 based on a movement start notification from the driving device 200. The movement start notification may indicate that the movement of the antenna 300 starts from the position 0. The antenna 300 starts the radio wave transmission for reading the information stored in the radio tag 600.

The first acquisition unit 1013 acquires the tag data for determination of each radio tag 600 to be determined (ACT 3). In ACT 3, the first acquisition unit 1013 acquires the tag data for determination of each radio tag 600 to be determined, which is detected by the demodulation unit 110. If the first acquisition unit 1013 acquires the tag data for determination (ACT 3, YES), the process proceeds from ACT 3 to ACT 4. If the first acquisition unit 1013 does not acquire the tag data for determination (ACT 3, NO), the process proceeds from ACT 3 to ACT 5.

The first acquisition unit 1013 stores the tag data for determination in the storage device 111 based on the acquisition of the tag data for determination of each radio tag 600 to be determined (ACT 4).

The communication control unit 1012 determines whether or not the movement of the antenna 300 is ended (ACT 5). In ACT 5, for example, the communication control unit 1012 determines whether or not the movement of the antenna 300 from the position 0 to the position L is ended. The communication control unit 1012 may determine that the movement of the antenna 300 is ended based on a movement end notification from the driving device 200. The movement end notification may indicate that the movement of the antenna 300 is ended if the antenna 300 reaches the position L. If the movement of the antenna 300 is ended (ACT 5, YES), the process proceeds from ACT 5 to ACT 6. If the movement of the antenna 300 is not ended (ACT 5, NO), the process proceeds from ACT 5 to ACT 3.

The first acquisition unit 1013 repeats the processes of ACT 3 and ACT 4 from the time when the movement of the antenna 300 starts at the position 0 until the time when the movement thereof is ended at the position L.

In ACT 3, the first acquisition unit 1013 acquires the tag data for determination of each radio tag 600 to be determined at a plurality of positions of the antenna 300. The first acquisition unit 1013 acquires the tag data for determination of each radio tag 600 to be determined at each of the positions at the fixed space a at least from the position 0 to the position L. The first acquisition unit 1013 can acquire the position of the antenna 300 in cooperation with the driving device 200.

In ACT 4, the first acquisition unit 1013 stores, in the storage device 111, the tag data for determination of each radio tag 600 to be determined at the plurality of positions of the antenna 300. The first acquisition unit 1013 stores, in the storage device 111, the tag data for determination of each radio tag 600 to be determined at each of the positions at the fixed space a at least from the position 0 to the position L.

The communication control unit 1012 controls an end of the radio wave transmission from the antenna 300 (ACT 6). In ACT 6, for example, the communication control unit 1012 controls the end of the radio wave transmission from the antenna 300 based on the end of the movement of the antenna 300 from the position 0 to the position L. The antenna 300 ends the radio wave transmission for reading the information stored in the radio tag 600.

The input unit 1014 inputs the input data for determination into the learned model 1113 (ACT 7). In ACT 7, for example, the input unit 1014 acquires the input data for determination based on the measurement data 1111 stored in the storage device 111. The input data for determination is the tag data for determination of each radio tag 600 to be determined at a plurality of positions of the antenna 300. The plurality of positions of the antenna 300 in the input data for determination are the same as the plurality of positions of the antenna 300 in the learning data 1112. For example, the input data for determination is tag data for determining each radio tag 600 to be determined at each of the positions at the fixed space a from the position 0 to the position L. The input unit 1014 inputs the acquired input data for determination into the learned model 1113.

The second acquisition unit 1015 acquires the output data for determination from the learned model 1113 based on the input of the input data for determination into the learned model 1113 by the input unit 1014 (ACT 8). The output data for determination includes the data indicating whether the position of each radio tag 600 to be determined is included in the first range or the second range.

The output unit 1016 outputs, to the terminal 400, a determination result including the output data for determination acquired by the second acquisition unit 1015. The determination result may include the information that is stored in each radio tag 600 to be determined and is read by the reading device 100. The terminal 400 may process the information stored in each radio tag 600 to be determined, depending on whether the radio tag 600 to be determined is included in the first range or the second range. The terminal 400 may define, as a processing target, the information stored in each radio tag 600 to be determined included in the first range. The terminal 400 may not be required to define, as the processing target, the information stored in each radio tag 600 to be determined included in the second range.

An example of measuring the tag data for learning of the learning data 1112 used to generate the learned model 1113 will be described.

Figure 8:
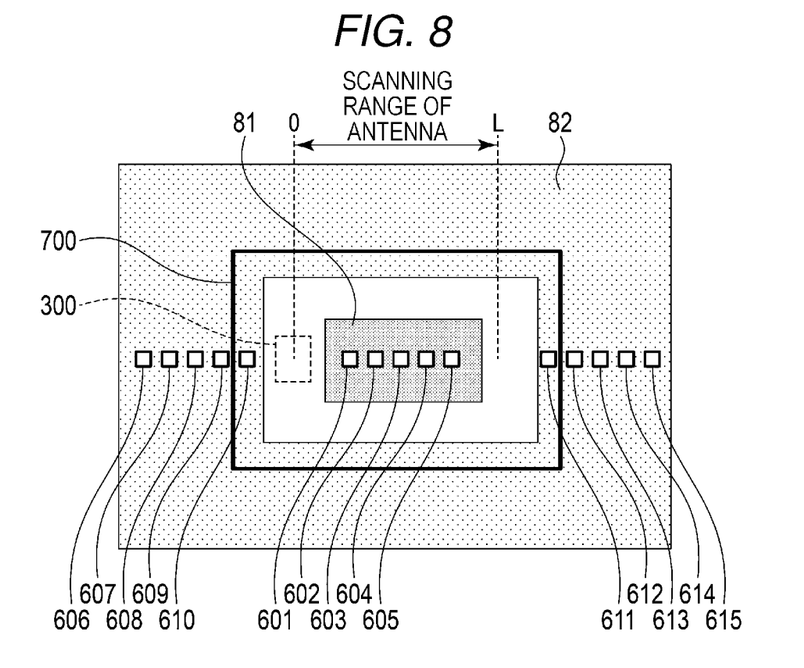
FIG. 8 is a diagram showing an arrangement example of a plurality of radio tags to be learned.

FIG. 8 is a diagram showing an arrangement example of a plurality of radio tags 601 to 615 to be learned, and is a plan view of the counter table 700 when viewed from above.

The radio tags 601 to 615 are located on a virtual surface including the horizontal plane of the counter table 700, and are arranged to be parallel to one direction in which the antenna 300 moves in the vertical direction. The radio tags 601 to 605 are located at different positions from each other, and are arranged to be included in the first range 81. The radio tags 601 to 605 are sequentially arranged to be separated from the position 0. While moving from the position 0 to the position L, the antenna 300 passes through the positions corresponding to the respective radio tags in the order of the radio tags 601 to 605.

The radio tags 606 to 610 are located at different positions from each other, and are arranged to be included in the second range 82. The radio tags 606 to 610 are sequentially arranged to be close to the position 0. While moving from the position 0 to the position L, the antenna 300 moves away from the radio tags 606 to 610.

The radio tags 611 to 615 are located at different positions from each other, and are arranged to be included in the second range 82. The radio tags 611 to 615 are sequentially arranged to be separated from the position L. While moving from the position 0 to the position L, the antenna 300 moves closer to the radio tags 611 to 615.

The number of the plurality of radio tags to be learned and the arrangement example thereof are not limited to the example shown in FIG. 8. A part of the plurality of radio tags to be learned may be arranged in the first range 81, and the rest of the plurality of radio tags to be learned may be arranged in the second range 82. Moreover, areas not included in 81 and 82 in FIG. 8 (white areas) may also be trained as the 82 areas. There is no particular limitation to the training areas, as the training areas are defined in advance for each use, and these training areas can change from use to use. The size of the training area can change from use to use.

The tag data for learning of the radio tags 601 to 615 at a plurality of positions of the antenna 300 will be described. Here, phase data will be described as an example of the tag data for learning.

Figure 9:
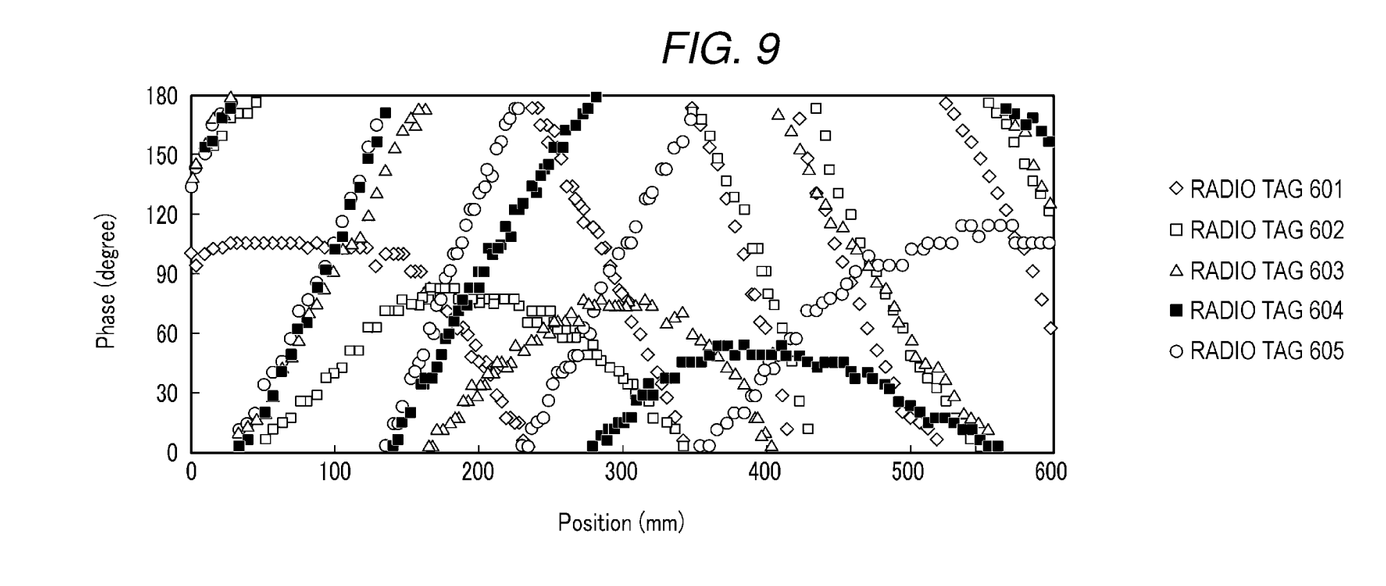
FIG. 9 is a graph showing an example of tag data for learning.

FIG. 9 is a graph showing an example of the tag data for learning of the radio tags 601 to 605 at a plurality of positions of the antenna 300.

A horizontal axis indicates the position of the antenna 300. It is assumed that the position L is 600 mm. A vertical axis indicates a phase. The graph shows the phase of each of the radio tags 601 to 605 at each of the positions at the fixed space a from the position 0 to the position L.

The respective phases of the radio tags 601 to 605 change as the position of the antenna 300 changes. This is because distances between the antenna 300 and the respective radio tags 601 to 605 change as the antenna 300 moves. Regardless of the position of the antenna 300, the respective phases of the radio tags 601 to 605 are different. This is because the distances between the antenna 300 and the respective radio tags 601 to 605 are different.

Figure 10:
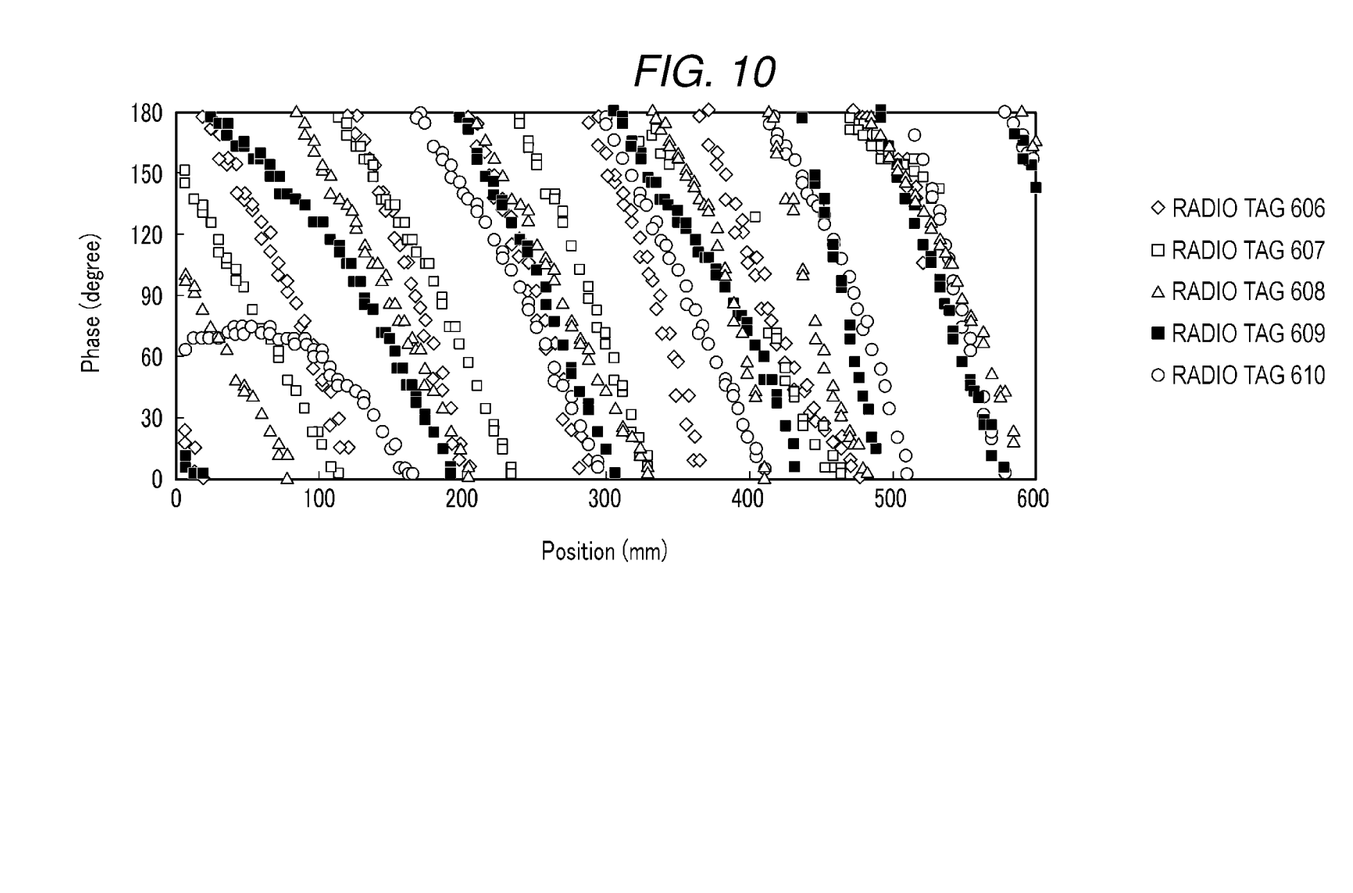
FIG. 10 is a graph showing another example of the tag data for learning.

FIG. 10 is a graph showing an example of the tag data for learning of the radio tags 606 to 610 at a plurality of positions of the antenna 300.

A horizontal axis indicates the position of the antenna 300. It is assumed that the position L is 600 mm. A vertical axis indicates a phase. The graph shows the phase of each of the radio tags 606 to 610 at each of the positions at the fixed space a from the position 0 to the position L.

The respective phases of the radio tags 606 to 610 change as the position of the antenna 300 changes. Regardless of the position of the antenna 300, the respective phases of the radio tags 606 to 610 are different.

Figure 11:
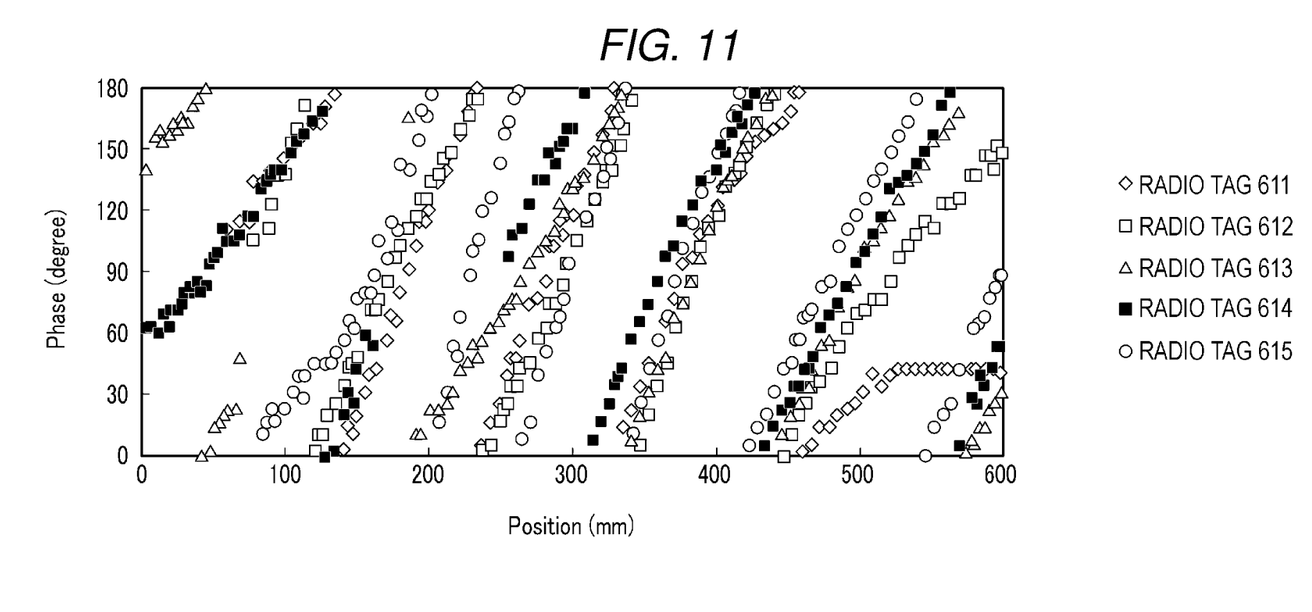
FIG. 11 is a graph showing still another example of the tag data for learning.

FIG. 11 is a graph showing an example of the tag data for learning of the radio tags 611 to 615 at a plurality of positions of the antenna 300.

A horizontal axis indicates the position of the antenna 300. It is assumed that the position L is 600 mm. A vertical axis indicates a phase. The graph shows the phase of each of the radio tags 610 to 615 at each of the positions at the fixed space a from the position 0 to the position L.

The respective phases of the radio tags 611 to 615 change as the position of the antenna 300 changes. Regardless of the position of the antenna 300, the respective phases of the radio tags 611 to 615 are different.

Characteristics of the phase data are described, and the same also applies to characteristics of the radio wave reception strength data. The respective radio wave reception strengths of the radio tags 601 to 615 change as the position of the antenna 300 changes. This is because distances between the antenna 300 and the respective radio tags 601 to 615 change as the antenna 300 moves. Regardless of the position of the antenna 300, the respective radio wave reception strengths of the radio tags 601 to 615 are different. This is because the distances between the antenna 300 and the respective radio tags 601 to 615 are different.

As described above, the processor 101 of the reading device 100 measures the tag data for learning of the plurality of radio tags 600 to be learned at the plurality of positions of the antenna 300. The processor 101 stores the measured tag data for learning in the storage device 111. The tag data for learning forms the learning data 1112.

Figure 12:
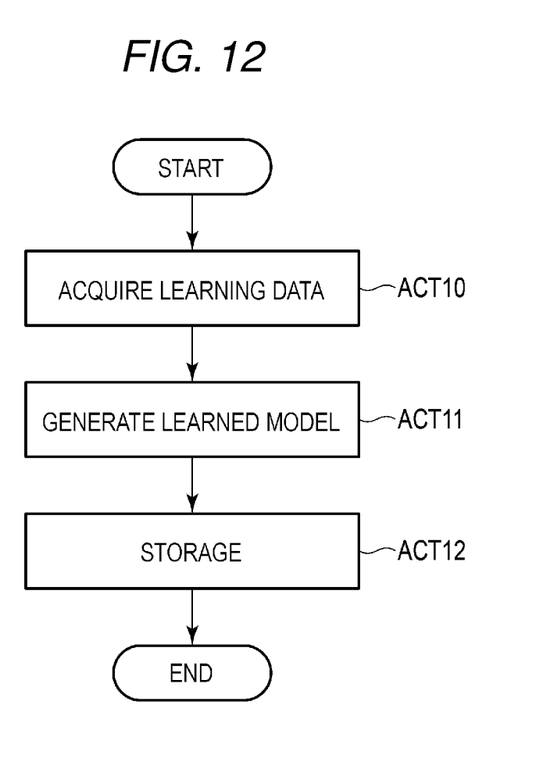
FIG. 12 is a flowchart showing an example of a generation process of a learned model by the processor of the reading device.

FIG. 12 is a flowchart showing an example of a generation process of the learned model 1113 by the processor 101 of the reading device 100.

A processing procedure to be described below is only an example, and each process may be changed as much as possible. In the processing procedure to be described below, steps can be appropriately omitted, replaced, and added according to the embodiment.

The model processing unit 1017 may start the generation process of the learned model 1113 at any timing, and newly generate the learned model 1113. The model processing unit 1017 may start the generation process of the learned model 1113 at any timing and update the learned model 1113.

The model processing unit 1017 acquires the learning data 1112 (ACT 10). In ACT 10, the model processing unit 1017 acquires the learning data 1112 from the storage device 111.

The model processing unit 1017 generates the learned model 1113 by the machine learning based on the learning data 1112 (ACT 11). In ACT 11, for example, the model processing unit 1017 learns the learning data 1112 by the machine learning. The model processing unit 1017 estimates a relationship between the tag data for learning of the plurality of radio tags 600 to be learned at a plurality of positions of the antenna 300 and the correct answer data indicating whether each of the plurality of radio tags 600 to be learned is included in the first range or the second range. The model processing unit 1017 generates the learned model 1113 based on the estimation. The machine learning is a neural network and the like, and is not limited thereto.

The tag data for learning of the radio tag 600 to be learned changes depending on a distance between the antenna 300 and the radio tag 600 to be learned, even if the tag data for learning thereof is the phase data or the radio wave reception strength data. A pattern of the tag data for learning of the radio tag 600 to be learned at the plurality of positions of the antenna 300 is different for each position of the radio tag 600 to be learned. There can be a certain correlation between the tag data for learning of the radio tag 600 to be learned at the plurality of positions of the antenna 300 and the position of the radio tag.

The model processing unit 1017 stores the generated learned model 1113 in the storage device 111 (ACT 12).

According to the embodiment, the communication device can input, into the learned model, the tag data of each radio tag at a plurality of positions of the antenna. The communication device can acquire the data indicating whether each radio tag is included in the first range or the second range from the learned model. Accordingly, the communication device can improve the accuracy of the data indicating whether each of the plurality of radio tags is included in the first range or the second range. As a result, the communication device provides a technique for improving the accuracy of determining the position of the radio tag.

The tag data can include the phase data. The tag data can include the radio wave reception strength data. Accordingly, the communication device can improve the accuracy of the data indicating whether each of the plurality of radio tags is included in the first range or the second range by using the phase data or the radio wave reception strength data.

The communication device can generate the learned model by the machine learning based on the learning data. The learning data can include the tag data of a plurality of radio tags at a plurality of positions of the antenna. The learning data can include the data indicating whether each of the plurality of radio tags is included in the first range or the second range. Accordingly, the communication device can generate a highly accurate learned model.

A modification of the embodiment will be described.

The embodiment describes an example in which the processor 101 of the reading device 100 implements the model processing unit 1017 that generates the learned model 1113, and is not limited thereto. The generation of the learned model 1113 may be implemented by a device other than the reading device 100.

The embodiment describes an example in which the storage device 111 of the reading device 100 stores the learning data 1112 and the learned model 1113, and is not limited thereto. At least one of the learning data 1112 and the learned model 1113 may be stored in a device different from the reading device 100.

The embodiment describes an example in which the processor 101 of the reading device 100 acquires the output data for determination by a software process, and is not limited thereto. The communication device 10 may include an inference device using the learned model. In this example, the input unit 1014 of the processor 101 inputs the input data for determination into the inference device. Inputting, by the reading device 100, the input data for determination into the learned model includes transmitting the input data for determination from the reading device 100 to the inference device. The second acquisition unit 1015 of the processor 101 acquires the output data for determination from the learned model based on the input of the input data for determination into the learned model. Acquiring, by the reading device 100, the output data for determination from the learned model includes receiving, by the reading device 100, the output data for determination from the inference device.

The communication device may be implemented by a plurality of devices as described in the embodiment, or may be implemented by one device in which functions of the plurality of devices are integrated. The reading device, the driving device, and the antenna may be implemented by one device in which functions thereof are integrated. The reading device may be implemented by a plurality of devices respectively having a distributed function.

A program may be transferred in a state of being stored in a device according to the embodiment, or may be transferred in a state of not being stored in the device. In the latter case, the program may be transferred via a network or may be transferred in a state of being recorded in a recording medium. The recording medium is a non-temporary tangible medium. The recording medium is a computer-readable medium. The recording medium may be any medium such as a CD-ROM and a memory card as long as the recording medium can store the program and can be read by a computer, and a form thereof is not limited thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device, comprising:
   an antenna;
   a driving component configured to move a position of the antenna;
   a first acquisition component configured to acquire tag data of each radio tag based on a radio wave of each radio tag received by the antenna at a plurality of positions of the antenna;
   an input component configured to input, into a learned model, the tag data of each radio tag acquired by the first acquisition component at the plurality of positions of the antenna; and
   a second acquisition component configured to acquire, from the learned model, data indicating whether each radio tag is included in a first range or a second range based on the input of the tag data of each radio tag into the learned model by the input component,
   wherein the learned model is generated by machine learning based on learning data comprising the tag data of a plurality of radio tags at the plurality of positions of the antenna, and the data indicating whether each of the plurality of radio tags is included in the first range or the second range,
   wherein the second range is set to surround the first range.

2. The communication device according to claim 1, wherein the tag data comprises phase data.

3. The communication device according to claim 1, wherein the tag data comprises radio wave reception strength data.

4. The communication device according to claim 1, wherein the antenna is configured to transmit and receive a radio wave to and from the radio tag.

5. The communication device according to claim 1, wherein the radio tag is a radio frequency identification tag.

6. The communication device according to claim 1, wherein the first range and the second range do not overlap each other.

7. The communication device according to claim 1, wherein the first range and the second range are three-dimensional areas that do not overlap each other.

8. The communication device according to claim 1, wherein the second range surrounds the first range.

9. The communication device according to claim 1, wherein the second range is spaced apart from the first range without being adjacent thereto.

10. The communication device according to claim 1, wherein the second range is adjacent to the first range.

11. An information processing method, the method comprising:
    acquiring tag data of each radio tag based on a radio wave of each radio tag received by an antenna at a plurality of positions of the antenna;
    inputting, into a learned model, the tag data of each radio tag at the plurality of positions of the antenna; and
    acquiring, from the learned model, data indicating whether each radio tag is included in a first range or a second range based on the input of the tag data of each radio tag into the learned model,
    wherein the learned model is generated by machine learning based on learning data comprising the tag data of a plurality of radio tags at the plurality of positions of the antenna, and the data indicating whether each of the plurality of radio tags is included in the first range or the second range,
    wherein the second range is set to surround the first range.

12. The information processing method according to claim 11, wherein the tag data comprises phase data.

13. The information processing method according to claim 11, wherein the tag data comprises radio wave reception strength data.

14. The information processing method according to claim 11, further comprising transmitting and receiving a radio wave to and from the radio tag.

15. The information processing method according to claim 11, wherein the radio tag is a radio frequency identification tag.

16. The information processing method according to claim 11, wherein the first range and the second range do not overlap each other.

17. The information processing method according to claim 11, wherein the first range and the second range are three-dimensional areas that do not overlap each other.

18. The information processing method according to claim 11, wherein the second range surrounds the first range.

19. The information processing method according to claim 11, wherein the tag data comprises at least one of phase data and radio wave reception strength data.

20. An information processing method of causing a computer to perform:

a function of acquiring tag data of each radio tag based on a radio wave of each radio tag received by an antenna at a plurality of positions of the antenna;

a function of inputting, into a learned model, the tag data of each radio tag at the plurality of positions of the antenna; and a function of acquiring, from the learned model, data indicating whether each radio tag is included in a first range or a second range based on the input of the tag data of each radio tag into the learned model, wherein the learned model is generated by machine learning based on learning data comprising the tag data of a plurality of radio tags at the plurality of positions of the antenna, and the data indicating whether each of the plurality of radio tags is included in the first range or the second range, wherein the second range is set to surround the first range.

* * * * *